United States Patent [19]

Ichihashi et al.

[11] Patent Number: 5,115,721
[45] Date of Patent: May 26, 1992

[54] CHANGE-OVER VALVE

[75] Inventors: Koji Ichihashi; Kyoji Tanaka, both of Saitama, Japan

[73] Assignee: Zexel Corporation, Tokyo, Japan

[21] Appl. No.: 613,137

[22] Filed: Nov. 15, 1990

[30] Foreign Application Priority Data

Nov. 20, 1989 [JP] Japan .................. 1-301617

[51] Int. Cl.⁵ .......................................... F15B 13/07
[52] U.S. Cl. ................................. 91/512; 91/517; 137/596.17; 137/596.2; 192/87.14; 192/109 F
[58] Field of Search ............ 91/420, 512, 517; 137/596.17, 596.2; 192/87.13, 87.18, 109 F, 87.14

[56] References Cited

U.S. PATENT DOCUMENTS

| | | | |
|---|---|---|---|
| 2,502,800 | 4/1950 | Renick | 91/420 |
| 3,473,566 | 10/1969 | Peppel | 137/596.2 |
| 4,172,582 | 10/1979 | Bobnar | 91/420 X |
| 4,597,557 | 7/1986 | Krieger et al. | 91/420 X |
| 4,667,570 | 5/1987 | Jensen et al. | 91/420 |

Primary Examiner—Gerald A. Michalsky
Attorney, Agent, or Firm—John E. Toupal; Harold G. Jarcho

[57] ABSTRACT

A change-over valve including a valve housing defining an inlet port for receiving fluid from a fluid pressure supply, a first outlet port for feeding operating fluid to a first fluid responsive actuator, a second outlet port for feeding operating fluid to a second fluid responsive actuator, and drain port means for draining fluid to a fluid reservoir; and a spool retained by the housing and movable therein between first and second positions, the housing and the spool in its first position providing communication between the inlet port and the first outlet port and preventing communication between the inlet port and the second outlet port, and the housing and the spool in its second position providing communication between the inlet port and the second outlet port, and preventing communication between the inlet port and the first outlet port. Also included is a control valve movable between open and closed positions in response to the fluid pressure at the first outlet port, the control valve providing communication between the second outlet port and the drain port means when in its open position and preventing communication therebetween when in its closed position.

17 Claims, 2 Drawing Sheets

CHANGE-OVER VALVE

BACKGROUND OF THE INVENTION

The present invention relates generally to a change-over valve and, more particularly, to a change-over valve for producing time overlapped operation of a plurality of fluid pressure actuators.

In many applications a member is reciprocated or stopped at suitable positions by a reciprocating type hydraulic actuator. Typically, a piston is inserted into a cylinder to define a pair of oil chambers and a rod coupled to the piston extends externally from the cylinder. A general direction change-over valve of that type is shown in FIG. 2. More specifically, when a spool 18 is moved rightwardly (position shown in FIG. 2) from a neutral position, pressure oil is supplied from a hydraulic pump, not shown, to an input port 19 via a passage 7. In addition, pressure oil is supplied to a chamber at one end of an actuator via a central annular groove 20 of a spool 18, an output port 23 and a passage 8 producing forward movement of the hydraulic actuator. At the same time, oil in a chamber at the other end of the hydraulic actuator is introduced into an output port 17 via a passage 4 and then returned to an oil tank, not shown, via an annular groove or small diameter portion 26 on opposite ends of the spool 18 and a drain port 16. When the spool 18 is returned to the neutral position, a portion between the input port 19 and each of the output ports 17 and 23 is cut off by a pair of lands on the spool 18, and the hydraulic actuator is stopped at that position. Conversely, when the spool 18 is moved leftwardly from the neutral position, the direction of oil flow is reversed so that the hydraulic actuator is moved backward.

In the case where a single hydraulic actuator is driven by a change-over valve as described above, the hydraulic actuator is operated in the reverse direction immediately when the spool is switched. However, in the case where a pair of spring biased hydraulic actuators are driven by a change-over valve, operation of members driven by the pair of hydraulic actuators does not occur without an intermittent time delay. For example, a speed change gear or transmission for an agricultural tractor, a construction vehicle and the like is generally provided with a hydraulic type low-speed shift clutch and a hydraulic type high-speed shift clutch. When pressure oil is supplied to one of these hydraulic actuators, one of the clutches is connected. In a speed change gear of this kind, when the change-over valve is switched, for example, in order to disconnect the low-speed shift clutch and connect the high-speed shift clutch, the low-speed shift clutch is immediately disconnected but a delay occurs before pressure oil is fully supplied to the hydraulic actuator for the high-speed shift clutch. During the delay period, the vehicle speed is lowered or stopped followed by a very unsmooth up-shift.

The above described operation is illustrated in FIG. 3 which shows hydraulic actuators 31 and 32 for connecting and disconnecting a high-speed shift clutch 33 and a low-speed shift clutch 33a. A piston 36 is inserted into a cylinder 35 to define an oil chamber in one end thereof while a spring 34 is disposed on the other end to bias clutches 33 and 33a connected to the piston 36 through a rod 40 in a disconnecting direction. In the state illustrated in FIG. 3, pressure oil from a hydraulic pump 38 is supplied to an oil chamber of the hydraulic actuator 32 of the low-speed shift clutch 33a via an electromagnetic change-over valve 37 and oil in an oil chamber of the hydraulic actuator 31 of the high-speed shift clutch 33 is returned to an oil tank 39. When the electromagnetic change-over valve 37 is switched, the oil pressure of the hydraulic actuator 32 is released to the oil tank 39 via the electromagnetic change-over valve 37 and the low-speed shift clutch 33a is immediately disconnected. However, the high-speed shift clutch 33 is not connected until the pressure oil from the hydraulic pump 38 enters the oil chamber of the hydraulic actuator 31 to produce a stroke by the piston 36. Unsmooth operation occurs because if the load on the vehicle is high, the vehicle speed drops substantially after disconnection of the low speed clutch during shift and when the high-speed shift clutch 33 is connected, the vehicle quickly accelerates.

The object of the present invention, therefore, is to provide a change-over valve which can impart smooth operation without an intermittent delay period to members driven by a plurality of fluid pressure actuators.

SUMMARY OF THE INVENTION

The invention is a change-over valve including a valve housing defining an inlet port for receiving fluid from a fluid pressure supply, a first outlet port for feeding operating fluid to a first fluid responsive actuator, a second outlet port for feeding operating fluid to a second fluid responsive actuator, and drain port means for draining fluid to a fluid reservoir; and a spool retained by the housing and movable therein between first and second positions, the housing and the spool in its first position providing communication between the inlet port and the first outlet port and preventing communication between the inlet port and the second outlet port, and the housing and the spool in its second position providing communication between the inlet port and the second outlet port, and preventing communication between the inlet port and the first outlet port. Also included is a control valve movable between open and closed positions in response to the fluid pressure at the first outlet port, the control valve providing communication between the second outlet port and the drain port means when in its open position and preventing communication therebetween when in its closed position. The control valve delays release of the second actuator until activation of the first actuator.

According to one feature, the invention includes a bias mechanism biasing the control valve in its closed position. The bias establishes the pressure level at the first outlet port required to release the second actuator.

According to another feature of the invention, the spool further defines a drain passage between the second outlet port and the drain port means, and the control valve closes the drain passage in its closed position. Upon opening of the control valve, the drain passage drains fluid from the second actuator to cause release thereof.

According to further features of the invention, the spool further defines a cylinder and a control passage between the first outlet port and the cylinder; and a control piston is mounted in the cylinder, movable therein in response to a given fluid pressure level at the first outlet port, and operatively coupled to the control valve so as to produce movement thereof between its open and closed positions. The control piston responds to fluid pressure at the first outlet port by producing desired control valve operation.

According to other features of the invention, the spool is movable in the housing along a given path, the cylinder is aligned with the given path, the drain passage includes a portion transverse to the given path, the control passage includes a portion transverse to the given path: the inlet port is straddled by the first and second outlet ports, and the drain port means comprises first and second drain ports straddling the first and second outlet ports. This low cost combination provides the desired control functions.

According to still other features of the invention, the spool is further movable into a neutral position intermediate the first and second positions, and the housing and spool in its neutral position prevent communication between the inlet port and either the first or second outlet ports. The neutral position enhances desired overlapping operation of the first and second actuators.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
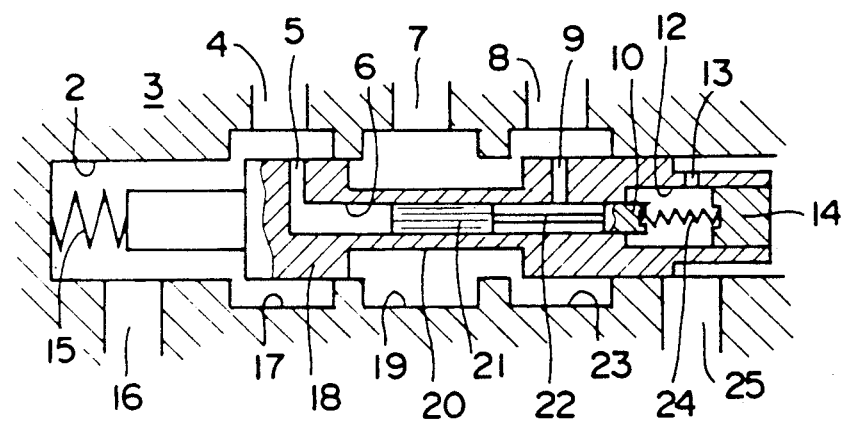
FIG. 1 is a side sectional view of a change-over valve according to the present invention.

As shown in FIG. 1, a change-over valve according to the present invention comprises a valve housing 3 defining a valve cylinder 2, a spool 18 fitted into the valve cylinder 2 and movable in a given longitudinal path therein, a hydraulic actuator including a piston 21 retained in a cylinder 6, and a control valve 10 retained by the spool 18. The valve cylinder 2 defines in its central portion an input port 19, first and second output ports 17 and 23 straddling the input port 19, and drain ports 16 and 25 straddling the output ports 17 and 23. Communicating with the input port 19 is a discharge opening of a hydraulic pump (not shown) via a passage 7. The output ports 17 and 23 communicate with oil chambers of a pair of hydraulic actuators 31, 32 and the drain ports 16 and 25 communicate with an oil reservoir tank 39 (FIG. 4).

In the illustrated embodiment, the spool 18 can be switched between an intermediate neutral position, a first leftward operating position and a second rightward operating position (shown) by an electromagnetic actuator (not shown) coupled to the right end of the spool 18 against a force of a spring 15 interposed between an end wall of the valve cylinder 2 and the left end of the spool 18. Such a structure as described above is substantially similar to that of the prior art device shown in FIG. 2. However, according to the present invention, the piston 21 is slidably fitted in an axial cylinder 6 defined by the spool 18 so as to constitute a hydraulic actuator. The left end of the cylinder 6 always communicates with the first output port 17 via a radial sensing port passage 5 extending transversely to the longitudinal axis of the spool 18. Connecting the control valve 10 to the piston 21 is a stem 22. A bias spring 24 is interposed between the control valve 10 and a plug 14 closing a cylindrical portion 12 of the spool 18 having a larger diameter than that of the cylinder 6.

An intermediate portion of the cylinder 6 always communicates with the output port 23 via a radial passage 9 extending transversely to the longitudinal axis of the spool 18. The cylindrical portion 12 always communicates with the drain port 25 via a radial passage 13 in the spool 18. Together, the passage 9, the cylinder 6, the cylindrical portion 12 and the passage 13 constitute a passage providing communication between the output port 23 and the drain port 25. That passage is normally closed by the valve 10 biased in a closed position by the spring 24.

Figure 4:
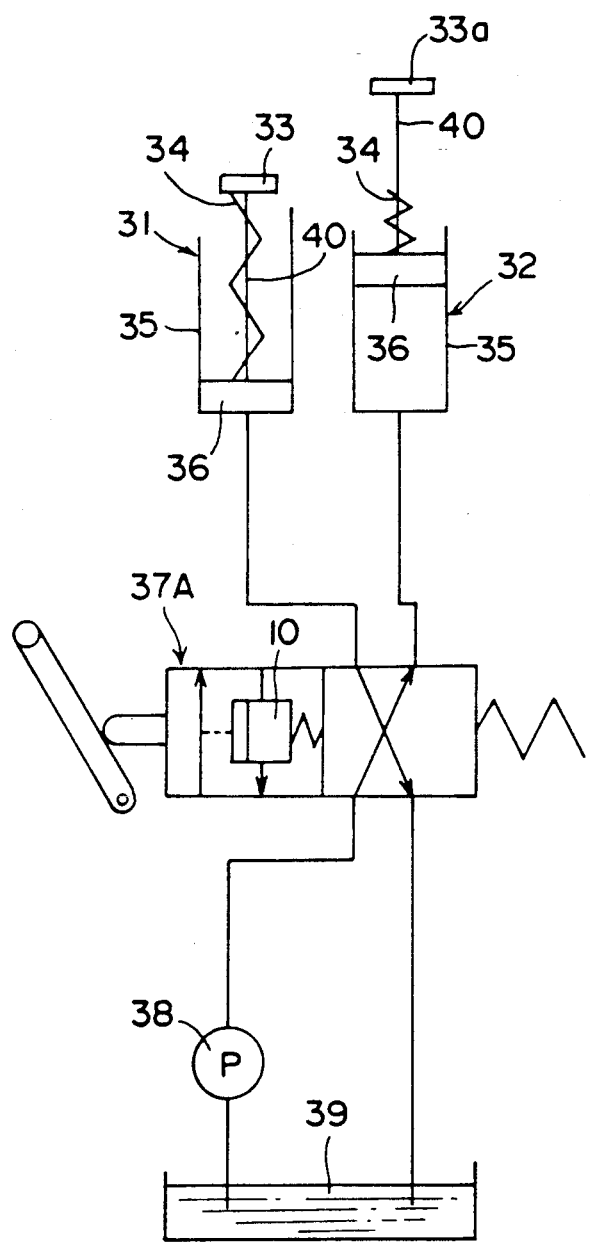
FIG. 4 is a hydraulic circuit diagram illustrating operation of a hydraulic type clutch of a speed change gear provided with a change-over valve according to the present invention.

FIG. 4 is a hydraulic circuit diagram in which hydraulic actuators for connecting and disconnecting a hydraulic type low-speed shift clutch and a hydraulic type high-speed shift clutch are controlled by the change-over valve 37A according to the present invention. At the second operating position of the spool 18, shown in FIG. 1, the input port 19 and the second output port 23 communicate via an annular groove 20 in the spool 18. Accordingly, the pressure oil from a hydraulic pump is supplied to the hydraulic actuator 32 via the passage 7, the input port 19, the output port 23 and the passage 8.

When the spool 18 is switched to the first or leftward operating position, the input port 19 and the first output port 17 communicate via the annular groove 20 in the spool 18. Accordingly, pressure oil from a hydraulic pump is supplied to the hydraulic actuator 31 via the passage 7, the input port 19, the output port 17 and the passage 4. However, since the second output port 23 remains closed by right-hand land of the spool 18, the hydraulic actuator 32 connected to the passage 8 is not moved backward by the spring 34. Furthermore, since the pressure at the first output port 17 is very low until the hydraulic actuator 31 connected to the passage 4 is fully activated, the piston 21 is not moved and the control valve 10 remains closed.

When the operation of the hydraulic actuator 31 connected to the passage 4 is completed, oil pressure at the first output port 17 increases to a given level and is applied to the piston 21 via the sensing port 5 and the cylinder 6. Therefore, the piston 21 moves rightwardly, and the control valve 10 moves out of the cylinder 6 into the large diameter cylindrical portion 12 against the force of the bias spring 24. At that time, the output port 23 communicates with the drain port 25 via the passage 9, the cylinder 6, the cylindrical portion 12 and the passage 13. The hydraulic actuator 32 connected to the passage 8, therefore, is moved backwardly by the spring 34.

About the same time that the forward operation of the hydraulic actuator 31 connected to the passage 4 is completed as the spool 18 is switched to its first or leftward operating position, hydraulic actuator 32 connected to the passage 8 is released. Accordingly, disconnection of the low-speed shift clutch 33a and connection of the high-speed shift clutch 33 are simultaneously effected without any intermittent delay to achieve smooth speed change operation. The time relationship between the release of the hydraulic actuator 32 following the activation of the hydraulic actuator 31 is determined by an initial set load of the spring 24.

Figure 2:
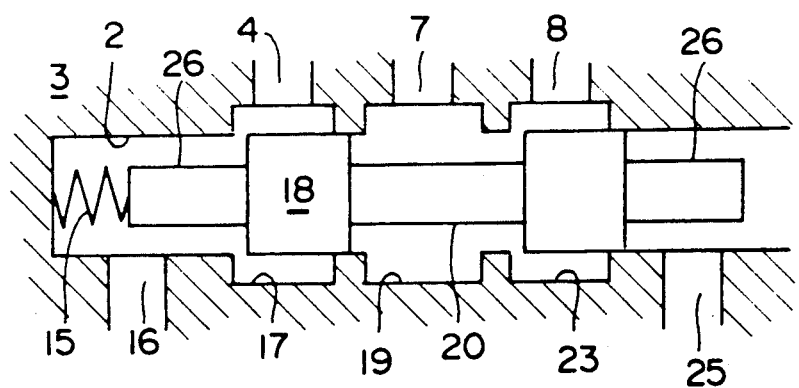
FIG. 2 is a side sectional view of a conventional change-over valve.
Figure 3:
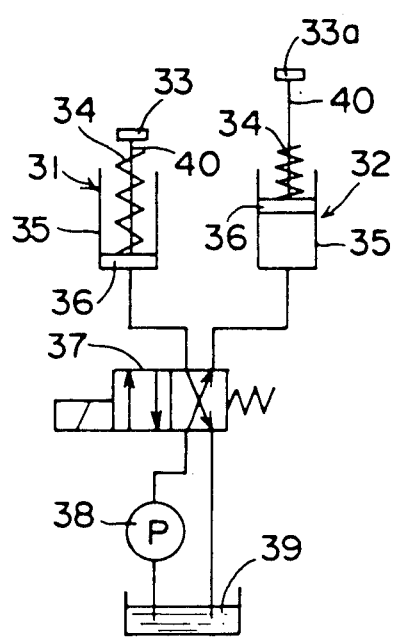
FIG. 3 is a hydraulic circuit diagram illustrating conventional operation of a hydraulic type clutch of a speed change rear.

The change-over valve (FIG. 1) according to the present invention can be manufactured by merely omitting certain machining operations and adding other machining operations to the conventional spool 18 (FIG. 2). No change in dimensions of the valve housing 3 or the spool 18 are required. Therefore, the advantages achieved by the invention are provided without a significant increase in manufacturing cost.

Obviously, many modifications and variations of the present invention are possible in light of the above teachings. For example, the present invention can be applied not only to a hydraulic type clutch but also to other hydraulic operating apparatus in which time overlapping operation of plural actuators is desirable. It is to be understood, therefore, that the invention can be practiced otherwise than as specifically described.

What is claimed is:

1. A hydraulic system comprising:
   a first spring biased hydraulic actuator;
   a second spring biased hydraulic actuator;
   a hydraulic pump;
   a fluid reservoir;
   valve housing means defining inlet port means connected to receive fluid from said hydraulic pump, a first outlet port connected for feeding operating fluid to said first spring biased hydraulic actuator, a second outlet port connected for feeding operating fluid to said second spring biased hydraulic actuator, drain port means connected for draining fluid to said fluid reservoir;
   spool means retained by said housing means and movable therein between first and second positions; said housing means and said spool means in said first position providing communication between said inlet port means and said first outlet port, and preventing communication between said inlet port means and said second outlet port, and said housing means and said spool means in said second position providing communication between said inlet port means and said second outlet port, and preventing communication between said inlet port means and said first outlet port; and
   control valve means retained by said spool means and having a sensing port communicating directly with said first outlet port so as to produce movement of said control valve means between open and closed positions in response only to the fluid pressure at said first outlet port, said control valve means providing communication between said second outlet port and said drain port means when in said open position and preventing communication therebetween when in said closed position.

2. A hydraulic system according to claim 1 wherein said control valve means is moved to said open position by fluid pressure above a given level at said first outlet port and to said closed position by fluid pressure less than said given level at said first outlet port.

3. A hydraulic system according to claim 2 including bias means biasing said control valve means in said closed position.

4. A hydraulic system according to claim 3 wherein said spool means defines a drain passage between said second outlet port and said drain port means, and said control valve closes said drain passage in said closed position.

5. A hydraulic system according to claim 4 wherein said spool means further defines a cylinder and a control passage between said first outlet port and said cylinder; and including a control piston mounted in said cylinder, movable therein in response to said given fluid pressure level at said first outlet port, and operatively coupled to said control valve so as to produce movement thereof between said open and closed positions.

6. A hydraulic system according to claim 2 wherein said spool means defines a drain passage between said second outlet port and said drain port means, and said control valve closes said drain passage in said closed position.

7. A hydraulic system according to claim 6 wherein said spool means further defines a cylinder and a control passage between said first outlet port and said cylinder; and including a control piston mounted in said cylinder, movable therein in response to said given fluid pressure level at said first outlet port, and operatively coupled to said control valve so as to produce movement thereof between said open and closed positions.

8. A hydraulic system according to claim 7 wherein said spool means is movable in said housing means along a given path, said cylinder is aligned with said given path, said drain passage includes a portion transverse to said given path, and said control passage includes a portion transverse to said given path.

9. A hydraulic system according to claim 8 wherein said inlet port means is straddled by said first and second outlet ports, and said drain port means comprises first and second drain ports straddling said first and second outlet ports.

10. A hydraulic system according to claim 1 wherein said spool means is further movable into a neutral position intermediate said first and second positions, and wherein said housing means and said spool means in said neutral position prevent communication between said inlet port means and either said first or second outlet ports.

11. A hydraulic system according to claim 10 wherein said control valve system means is moved to said open position by fluid pressure above a given level at said first outlet port and to said closed position by fluid pressure less than said given level at said first outlet port.

12. A hydraulic system according to claim 11 including bias means biasing said control valve means in said closed position.

13. A hydraulic system according to claim 12 wherein said spool means defines a drain passage between said second outlet port and said drain port means, and said control valve closes said drain passage in said closed position.

14. A hydraulic system according to claim 13 wherein said spool means further defines a cylinder and a control passage between said first outlet port and said cylinder; and including a control piston mounted in said cylinder, movable therein in response to said given fluid pressure level at said first outlet port, and operatively coupled to said control valve so as to produce movement thereof between said open and closed positions.

15. A hydraulic system according to claim 14 wherein said spool means defines a drain passage between said second outlet port and said drain port means, and said control valve closes said drain passage in said closed position.

16. A hydraulic system according to claim 15 wherein said spool means further defines a cylinder and a control passage between said first outlet port and said cylinder; and including a control piston mounted in said cylinder, movable therein in response to said given fluid pressure level at said first outlet port, and operatively coupled to said control valve so as to produce movement thereof between said open and closed positions.

17. A hydraulic system according to claim 16 wherein said spool means is movable in said housing means along a given path, said cylinder is aligned with said given path, said drain passage includes a portion transverse to said given path, and said control passage includes a portion transverse to said given path.

* * * * *